Figures 1, 2:
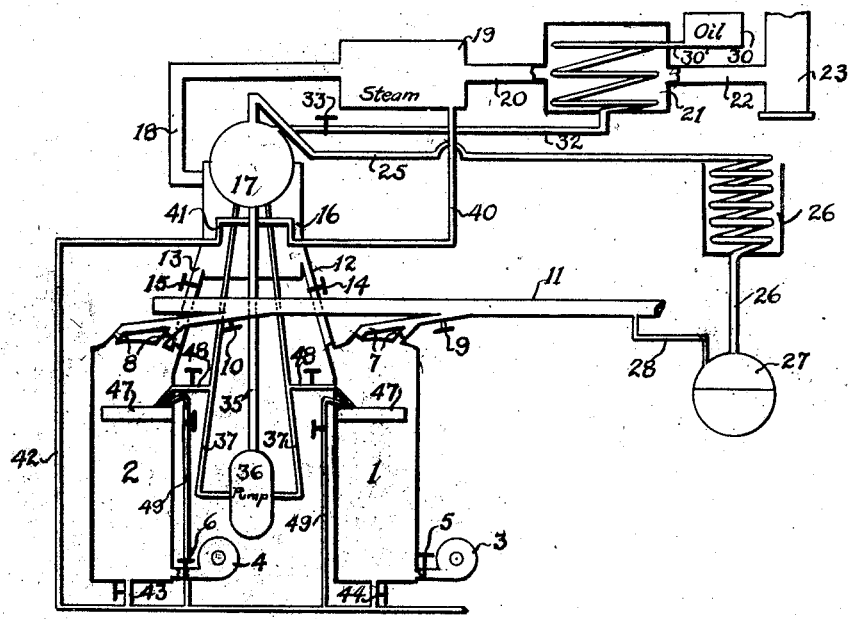

Feb. 4, 1930. A. SCHWARZ 1,745,454

PROCESS OF PRODUCING ENRICHED WATER GAS

Filed Nov. 18, 1925

Alfred Schwarz, INVENTOR

BY

Gifford & Scull ATTORNEYS

Patented Feb. 4, 1930

1,745,454

UNITED STATES PATENT OFFICE

ALFRED SCHWARZ, OF UPPER MONTCLAIR, NEW JERSEY, ASSIGNOR TO COAL AND OIL PRODUCTS CORPORATION, A CORPORATION OF DELAWARE

PROCESS OF PRODUCING ENRICHED WATER GAS

Application filed November 18, 1925. Serial No. 69,723.

This invention relates to a process of producing gas from coal and oil while, at the same time, the low boiling products are distilled from the oil and the residue is used for increasing the production of gas.

In the process of enriching water gas by adding hydrocarbons thereto, it is desirable to obtain a maximum efficiency from the hydrocarbons and to utilize as much as possible of the heat value of these hydrocarbons, and prevent the production of undesirable byproducts. So-called gas oil is used at present for the purpose of enriching the gas, but on account of the fact that it is a refinery product of constantly increasing price, it is desirable to use a cheaper oil. Heavy oil and residues are being produced in increasing quantities, and by the present process they can be economically utilized for enriching the gas in a satisfactory manner.

Attempts to use mixtures of oil, such as crude oil, containing kerosene, gas oil, fuel oil and asphalt, have usually resulted in the production of large quantities of lamp black, or emulsions which seem to be a mixture of lamp black, oil and water. The apparent cause of this is that it is impossible to crack oils of widely varying boiling and cracking temperatures under the same temperature conditions, because the heavy oils of the olefin series have a much lower temperature of dissociation, for example, than the oils of the paraffin series that have a kerosene boiling point range. For this reason it is desirable to use for gas enrichment oils which have a narrow boiling range of temperature, and adjust the temperature of the water gas generator so that the maximum portion of these oils will be cracked for enriching the water gas. If a hydrocarbon which will easily break down is subjected to high temperatures, it will break down into undesirable hydrogen and methane of practically no illuminating value, and finely divided carbon or lamp black may also be produced, while if the temperature is suitable for enriching gas with this particular hydrocarbon, and a paraffin hydrocarbon belonging to the kerosene group, for example, is present, the latter may not be broken down at all, but merely distilled, or it may be broken down into lighter oils which would recondense and commingle with the lamp black and recondensed steam and form very undesirable emulsions.

In refining oils, the oil may be distilled to recover light boiling fractions and the residues that are suitable for fuel oil, road oil and asphalt, or the oil may be distilled to dryness, leaving coke as a residue. In the first method a large portion of the valuable light oils remain in the residue and must be sold at low prices, while in the second method troubles arise because of the coke that remains in the still which is difficult to remove, and also causes danger of the still bottoms being burned out.

In the present process, I operate an oil still in conjunction with a water gas generator, thereby making a combination that has economical and technical advantages. In the operation of a water gas generator, the fuel in the generator has to be heated to incandescence, which is usually done by burning a part of the fuel under a forced draft. During this so-called "blow" period, the waste gases have heretofore been used either for heating carburettors and superheaters, or for firing waste heat boilers. In my process, the waste gases are used for heating an oil still in which hydrocarbon oil is distilled to leave a heavy residue, which residue is used for enriching the gas. By distilling the hydrocarbon oils I eliminate the light fractions and condense the same, thus recovering the light oils and preparing a heavy residue that has a relatively close range of boiling points, and also a close range of cracking temperature. A boiling point range of 100 degrees F. is considered a narrow boiling point range in petroleum oils. Crude oils usually range in boiling point from about 110° F. to about 700° F. and as is well known, different products are distilled over at different temperatures. This still residue is then supplied to the water gas generator while it is still hot, during the period in which the enriched gas is made, thus converting the oil into gas and oil coke. The coke is deposited upon the fuel bed of the water gas generator, which is in part consumed during the next blow period, and portions thereof are consumed for producing carbon monoxide during the gas making period.

The invention will be understood from the description in connection with the accompanying drawings, in which an arrangement of apparatus is illustrated for carrying out the process. In the drawings, Fig. 1 is a somewhat diagrammatic representation of the apparatus in elevation and Fig. 2 is a side elevation of one of the water gas generators. In the drawings, reference characters 1 and 2 indicate water gas generators that may be of the usual type. These generators are provided with air blowers 3 and 4, which are regulated by the valves 5 and 6. Gas outlets 7 and 8 provided with valves 9 and 10 extend from the top of the generators to the gas main 11. Flues 12 and 13 with valves 14 and 15 therein also extend from the top of the gas generators to the furnace 16 of the still 17, and a flue 18 extends from this furnace to the steam generator 19, from which a flue 20 extends to the preheater 21, from whence a flue 22 leads to the smoke stack 23.

A vapor pipe 25 leads from the top of the oil still 17 to the condenser 26, from which a pipe 26' leads to the receiver 27. A pipe 28 for uncondensed gases leads from the receiver 27 to the gas main 11.

An oil supply tank 30 has a pipe 30' leading to the coil in the preheater 21, from whence a pipe 32 provided with a valve 33 leads to the still 17.

A pipe 35 for heavy oil residues leads from the bottom of still 17 to a pump 36, from the outlets of which pipes 37 for circulating the heavy residues lead back to the still 17.

A steam pipe 40 leads from the boiler 19 through the superheater coil 41 in the furnace 16. A superheated steam pipe 42 leads from the superheater 41 below the generators 1 and 2, and branched valved pipes 43 and 44 lead into the bottom of these generators. The generators are provided with grates 45, upon which the coal 46 rests. Inlets 47 of refractory material extend into the upper portions of the generators 1 and 2, and branched valved pipes 48 from the pipes 37 lead the hydrocarbon residues into the same. Branched valved superheated steam pipes 49 extend from the pipe 42 into the inlets 47.

The operation is as follows: Coal or coke is introduced into one of the water gas generators and ignited and brought to incandescence in the usual manner by an air blow period. The hot products of combustion therefrom pass through the pipe 12 into the furnace 16 and distil the oil in the still 17 which has been introduced through the pipe 32. The hot products of combustion pass from the furnace 16 through the flue 18, and the heating chamber of the steam boiler 19, thus generating steam, and then passes through the preheater 21 to heat the oil that flows to the still 17 from the tank 30, and the products of combustion which have in this manner been greatly cooled pass through the flue 22 into the stack 23. The oil vapors distilled in the still 17 pass through the pipe 25 and are condensed and collected in the receiver 27, the uncondensed gases passing through the pipe 28 into the main 11. As soon as the fuel on the grates 45 has been sufficiently heated, the valve 14 is closed, the valve 9 is opened and steam is introduced through the branch pipe 44, thus generating water gas. At the same time, the valve 48 is opened to introduce oil residue from the still 17 into the generator 1, which residue is cracked and causes the gas to be enriched, the carbon from from the cracked oil collecting upon the fuel ready to be burned for heating purposes, or to form water gas. During the water gas making period in the generator 1, the air blow period is taking place in generator 2 and vice versa, the valves being suitably manipulated as will be understood for this purpose, thus providing hot products for distilling the oil 17 from the generators alternately, and also obtaining gas for the main 11 alternately from the generators.

The light products are distilled off of the oil in the still 17 before any of the oil is used in the water gas generators and these products removed via pipe 25 to condenser 26. The residue from the still 17 usually ranges in boiling temperature from about 600 to 700° F., that is, the residue has a boiling point range of about 100 degrees which is a relatively narrow boiling range for petroleum oils. The gas generators 1 and 2 are brought to a temperature of about 1400° F. during the blow periods which temperature is sufficient to effect dissociation of such residue oils, and a small amount of steam may be introduced during the gas making period through the pipes 49. This steam is superheated to about 700° F. The water gas generating period of the gas generators may be continued for about four minutes, after which the oil is shut off, but the introduction of steam is continued for about two minutes longer to remove the last of the oil from the generator.

In operating this process using Mexican crude oil of about 10° Bé. gravity, I have obtained a distillate from the oil giving a yield of about 30% gas oil and kerosene, and 10% gasoline, the remainder or residue heavier than gas oil being used in the gas generators for enriching the gas. In this manner, I have obtained an enriched water gas that could be varied so as to have about 500 to 600 B. t. u. per cubic foot, with no undesirable by-products. It required approximately 24 to 28 pounds of coke and 2 to 3 gallons of oil for each thousand cubic feet of gas.

I claim:

1. The process of producing and enriching water gas, which comprises raising a fuel bed to a gas making temperature by air blowing, passing hot gases resulting from said blowing in heat exchange relation with oil to distill gas oil and lighter fractions therefrom, generating and superheating steam by means of said hot gases, discontinuing the blowing, introducing the superheated steam into said fuel bed thereby forming water gas, and introducing the heavier unvaporized portion of said oil into said water gas at a point where the temperature of said water gas is sufficient to crack said heavier unvaporized portion.

2. The process of producing enriched water gas, which comprises raising a fuel bed to a gas making temperature by blowing with air, passing hot gases resulting from said blowing in heat exchange relation with oil, discontinuing the blowing of said fuel bed and raising a second fuel bed to a gas making temperature by similarly blowing with air, passing resultant hot gases in heat exchange relation with said oil, the oil being heated sufficiently to vaporize lighter portions thereof, introducing steam into the first mentioned fuel bed thereby forming water gas, introducing unvaporized portions of said oil into said water gas to enrich the same, discontinuing said introduction of steam and unvaporized oil into said first mentioned fuel bed, discontinuing the blowing of said second fuel bed, passing steam thereinto to form water gas, and enriching said water gas by introduction of further unvaporized portions of said oil.

ALFRED SCHWARZ.